United States Patent [19]

Kurple

[11] Patent Number: 5,786,409
[45] Date of Patent: Jul. 28, 1998

[54] FOUNDRY RESINS

[76] Inventor: Kenneth R. Kurple, 9533 Springborn Rd., Anchorville, Mich. 48004

[21] Appl. No.: 659,614

[22] Filed: Jun. 6, 1996

Related U.S. Application Data

[63] Continuation of Ser. No. 259,970, Jun. 14, 1994, abandoned.
[51] Int. Cl.$^6$ .................. B22C 1/18; B22C 1/20; C08K 3/10
[52] U.S. Cl. .................. 523/142; 524/399; 524/590; 524/875; 523/143
[58] Field of Search ................... 523/142, 143; 524/399, 590, 875

[56] References Cited

U.S. PATENT DOCUMENTS

| | | | |
|---|---|---|---|
| 4,292,214 | 9/1981 | Blount | 523/400 |
| 4,352,390 | 10/1982 | Larson | 164/351 |
| 4,851,457 | 7/1989 | Kurple | 523/142 |
| 5,175,228 | 12/1992 | Wang et al. | 528/48 |

OTHER PUBLICATIONS

Kirk–Othmer, Encyclopedia of Chemical Technology vol. 15, 4th Ed. pp. 284–285.

*Primary Examiner*—Vasu Jagannathan
*Assistant Examiner*—John J. Guarriello
*Attorney, Agent, or Firm*—Woodling, Krost and Rust

[57] ABSTRACT

A process for making foundry cores and molds is disclosed as well as the core and molds which are produced as well as a sand binder. The binder is a resin which includes a lignin dissolved in a suitable solvent reacted and/or cured with an isocyanate material. The lignin used contains no more than 2% sodium ions. A polyether polyol may be added which has a functionality of greater than 3 and preferably at least 6. A tin catalyst is disclosed for use in the system which has a valence of +4 and one soluble in the system. A material is added to the system to give the mold or core a resistance to the water in core and mold washes. Suitable materials are propylene oxide derivatives of bis phenol A.

32 Claims, No Drawings

FOUNDRY RESINS

This application is a continuation of application Ser. No. 08/259,970 filed on Jun. 14, 1994 now abandoned.

Currently, a major invention to improve the green strength properties of sand cores and sand molds for the foundry industry has been disclosed in U.S. Pat. No. 4,851,457 which involves using lignin as a total replacement for phenol formaldehyde resins in foundry resins.

The present invention improves the green strength of sand cores and molds. One important aspect of this improvement is the increased tensile strength of a sand core or sand mold, especially in the area of sand cores, where these sand cores are used in high production equipment such as for automotive castings. Generally these sand cores are produced in high production automatic equipment, which drops the sand cores on a conveyor belt. At this point it is important the sand core have sufficient green strength as soon as possible so that when the sand core is dropped on the conveyor belt no breakage or damage to other cores occurs. If a sand core is damaged, it can produce a defective or scrap casting. This is also true in high production foundries where the sand molds are removed from the pattern as soon as possible in order to maximize production output. This situation is identical to sand molds where it is desirable to have molds with sufficient green strength before their removal from the pattern. Therefore, the stronger the sand molds are, the fewer scrap castings are produced.

The first feature of this present invention is the discovery that the level or presence of sodium or other inorganic ions in the lignin has a significant impact on the quality of the sand cores and sand molds. It has been found that if the sodium ions are too high, the resultant foundry resins made with "high sodium lignins" are unable to produce sand cores and molds with sufficient and timely green strength necessary for a useful product in the foundry industry. The high levels of sodium compounds or other inorganic ions cause problems with the solubility of lignin in the various solvents. Also, they affect the activity of various catalysts. These inorganic ions can continuously build up in the recycled foundry sand, since recycling is very customary.

As a consequence it has been discovered that by maintaining the level of sodium and/or other ions below a certain level makes it possible to minimize these problems that have been just described and produce sand cores and sand molds with sufficient green strength in the prescribed time that will produce quality castings.

It is desirable that the lignin contain not more than 2% sodium and preferable the lignin contain less than 1% sodium or other inorganic ions.

Another feature for improving the green strength of sand cores and sand molds has been discovered. As a part of the technology that was disclosed in U.S. Pat. No. 4,851,457, the lignin totally replaced the phenol-formaldehyde resin and the polyols such as material TP-440 mentioned in that patent altered to some degree the resin system. The TP-440 is a trifunctional polyether polyol. It has been discovered that in order to improve the green strength of a sand core or sand mold in a prescribed time the changing of the polyol to a higher functionality polyol, i.e., a polyol with a functionality of higher than 3, offers a significant improvement. The sand cores or sand molds using the higher functionality polyols create greater green strengths in a shorter time. This is especially true when a polyol such as Pluracol 975 is used. This is because Pluracol 975 has a functionality of six. Pluracol 975 is made by reacting propylene oxide with a sucrose. Pluracol 240 can also be used. This produces a molecule containing six reactive hydroxyl groups per molecule. When this molecule is compared to TP-440, which has only three reactive hydroxyl groups per molecule, it will be seen by those skilled in the art of foundry resin compositions, as taught in the examples of U.S. Pat. No. 4,852,457, higher green strength can be achieved in shorter time by replacing the TP-440 with Pluracol 975 in the described foundry compositions. This is because in the curing process, it is the objective of the lignin and polyol mixture to react with the polyisocyanate to produce a high molecular thermosetting polymer as soon as possible. This is the polymer system that binds all of the sand particles together to form a sand core or sand mold. The use of this polyol is of advantage whether the system has over 2% sodium or not.

The higher functionality that a molecule has will cause it to build a higher molecular weight polymer faster. What this means in the foundry industry is higher green strengths in a short period of time, which means higher productivity for producing sand cores and sand molds. Also, higher green strengths mean that the sand cores and sand molds will have fewer defects and therefore produce higher quality castings.

One of the ways to improve the quality of a casting is to use a core wash on the sand core or mold. It is generally common practice to core wash sand cores to improve the quality of the casting because the core wash offers extra protection from the molten metal. Sometimes the temperature of the molten metal is in excess of 3000° F. for certain metals such as steel or stainless steel.

Generally these core washes are a mixture of various pigments, a binder, and a solvent. In some cases the solvent is alcohol, such as isopropyl alcohol. Due to the fact alcohols are very flammable materials, core washes that use only water as a solvent are becoming preferred. However, water that is present in the water-based core wash tends to weaken the sand core. This creates a very serious problem, because as the sand core becomes weaker it has a tendency to break or chip, which will make it impossible to use, or the damaged sand core will produce a poor quality or scrap casting. Also, the weakened sand core will be less able to withstand the high temperatures and erosion characteristics of molten metal, thereby producing poor quality castings and even scrap castings.

It is a significant commercial advantage if the sand core could have an improved resistance to the water that is present in the core wash. In order to accomplish the improved resistance to water in the sand core, the resin that is used to make the sand core or sand mold should impart improved resistance to the water present in the water based core wash. It has been discovered as part of the inventions disclosed herein that by adding certain materials to the resin system, either in part one, the resin, or part two, which contains the isocyanate improved resistance to water can be obtained. Such an additive can also be added to the catalyst system if necessary. Such an additive has the ability to impart improved resistance to the water that is present in water based core washes. The additive can contain reactive functional groups such that these functional groups can react with the isocyanate groups present in the hardener. In this fashion, the additive becomes reacted into the resin system that is used to bind the sand particles together, which form the sand core or sand mold. An example of such an additive is a material known as Dow resin 565, which is a propylene oxide derivative of bis phenol A.

However, the additive can be such a material that does not contain any reactive functional groups which would react with the isocyanate groups present in the hardener.

Such an additive can also be incorporated with the lignin resin system, the isocyanate hardener system, or the catalyst system. Also, such materials as terpene resins, terpene phenolics, coumarone-indene resins, rosin modified phenolics, material and synthetic waxes, and also petroleum resins can all be added to the mixture to improve the resistance of the sand core or mold to water or water vapor as in humidity. One can also add rosin esters which have no reactive hydroxyls.

The incorporation of such a material in the resin system dramatically improves the resistance of a sand core or mold to moisture, water, vapor, humidity, and the water that is present in water based core washes.

One of the catalysts that is used in catalyzing the reaction between isocyanates and hydroxyl groups is tin. The advantage of tin catalysts is that they not only increase the rate of reaction but they also have a synergistic effect with a wide variety of amines. This combination of tin catalysts and amine catalysts will dramatically increase the rate of urethane reactions even faster than using each catalyst separately. This is important in the foundry industry because the faster the rate of reaction, the faster the resin system cures, which means that the various sand cores or sand molds will develop their green strength as fast as possible. The stronger a sand core or sand mold is means less breakage and higher production rates. However, the tin catalysts that are on the market are based on tin compounds wherein the tin ion has a valence of 2. The fact that the tin ion has a valence of 2 means this tin ion is easily oxidized to a tin ion with a valence of 4 in the presence of water. What happens then is that the tin compound becomes insoluble in resin systems and loses its catalyst activity. When this happens, the resin system does not cure properly and the sand cores and sand molds do not develop sufficient green strength. High levels of breakage of the sand cores and sand molds then occur. Since most foundry sands have a certain amount of moisture present, this moisture level alone is normally enough to cause a tin catalyst with a valence of 2 to lose its catalytic activity.

It has been found that tin catalysts which are tin compounds with a valence of 4 are soluble in these resin systems and function exceptionally well. These tin 4 compounds do not lose their catalytic activity when exposed to moisture. By using these tin 4 compounds this present invention enables a stable catalyst system to be used for foundry resins that use isocyanates as crosslinking or curing agents with or without polyol additives or whether or not the system has over 2% sodium. Such compounds may include dibutyltin Bis (1-Thioglycerol) which is Air Products & Chemicals product called DABCO T1402 catalyst.

EXAMPLE 1

Into a standard laboratory foundry muller which has a capacity for mixing at least 100 pounds of sand, 100 pounds of foundry sand was charged and allowed to mix. One pound of a 50% lignin solution that was made by mixing propylene carbonate, (a solvent from Arco Chemical), with a lignin that contained less than 2% sodium or other water soluble inorganic ions. This resin solution was then added to the sand and allowed to mix for two minutes. Then 0.4 pounds of Papi 27 (polymethylene polyphenyl isocyanate) was added to this mixture and allowed to mix for one minute. This foundry mix was molded into a core and then inert gas which contained a tertiary amine was passed through the core which rapidly cured the core so that it had sufficient green strength so that it could be removed from the mold. This cured mold was then placed in a sand core box and molten cast iron was poured into the mold. The molten iron surrounded the core and when sufficiently cooled, the cast iron part was removed from the mold. This core not only produced a good part, but the heat from the molten metal was sufficient to break the resin down so that after the metal set, the core became loose and sand was easily removed from the inside of the casting. This showed that the lignin molecule when properly cured with a polyisocyanate produces a core which has not only sufficient green strength but also is strong enough to withstand the heat from the molten metal until the molten metal sets. In addition, the lignin molecule readily broke down and enabled the sand to be easily removed.

The same example was again repeated with the exception that the lignin was replaced with kraft soda lignin.

The same example was again repeated as set forth initially except that Papi 27 was replaced with a 70% solution of Mondur PF, a commercial isocyanate terminated prepolymer in propylene glycol monomethyl ether acetate.

The same example was again repeated as set forth initially except that the 0.4 pounds of Papi 27 was replaced with a 70% solution in propylene glycol monomethyl ether acetate of 0.24 pounds of Papi 27, an aromatic polyisocyanate, and 0.25 pounds of Mondur PF, an isocyanate terminated prepolymer.

The same example was again repeated as set forth initially except that the 1 pound of 50% lignin solution in DBE was changed to 1 pound of 50% lignin solution dissolved in propylene carbonate.

The same example was again repeated as set forth initially except that the 1 pound of lignin was replaced by 1.0 pound of a mixture of lignin which consisted of 0.3 pounds of lignin, 0.1 pounds of Pluracol 101, a polyether polyol and 0.5 pounds of propylene carbonate, a solvent.

In these additional examples, the cores produced were as satisfactory as those produced in the initial example.

EXAMPLE 2

This example shows that the kraft lignin can be mixed with a polyether polyol such as Pluracol 975 or a combination of polyether polyols from BASF so that a wide variety of physical properties can be obtained. Into a Standard laboratory foundry muller which has the capacity for mixing at least 100 pounds of foundry sand, 100 pounds of foundry sand was charged and allowed to mix while 1 pound of a lignin polyether polyol blend was added to the sand. The lignin polyether polyol blend consisted of 1 part kraft lignin and 1 part Pluracol 975 polyether polyol (reaction product of propylene oxide and sucrose with a hydroxyl number of 390 functionality of +6 and parts DBE solvent (dimethyl glutarate, dimethyl adipate dimethyl succinate--Dupont-mixed aliphatic dimethyl esters). This mixture was allowed to mix for 2 minutes then 0.4 pounds of Papi 27, polyethylene polyphenyl isocyanate, was added to this mixture and allowed to mix for one minute. This foundry mix was molded into a core and then an inert gas which contained a tertiary amine was passed through the core which rapidly cured the core so that it had sufficient green strength so that it could be removed from the mold. This cured core was then placed in a sand core box and molten cast iron was poured into the mold. The molten cast iron surrounded the core and when sufficiently cooled, the cast iron part was removed from the sand mold. This core produced a good part, and the sand was easily removed from the sand mold.

The same example was again repeated with the exception that the lignin was replaced with kraft soda lignin.

The same example was again repeated as set forth initially except that the 0.5 pounds of Papi 27 was replaced with 0.8 pounds of a 70% solution of Mondur PF, a commercially available isocyanate terminated prepolymer, in propylene glycol monomethyl ether acetate.

In these additional examples, the cores produced were as satisfactory as those produced in the initial example.

EXAMPLE 3

This example illustrates the use of a tin catalyst in which the tin ion has a valence of +4 (known as DABCO T1402) to increase the rate of cure. A combination of tin and amine catalysts produce a synergistic effect on the rate of cure. It is possible to reduce the amount of time which the core has to be exposed to the amine in an inert gas (i.e. nitrogen) stream which will therefore improve productivity. Into a standard laboratory foundry muller which has the capacity for mixing at least 100 pounds of foundry sand, 100 pounds of foundry sand was charged and allowed to mix while 1 pound of 50% lignin solution in DBE (dimethyl glutarate, dimethyl adipate, dimethyl succinate--Dupont mixed aliphatic dimethyl esters) which contained 0.4 pounds of Papi 27, the aromatic isocyanate was added to this mixture and allowed to mix for one minute. DABCO T1402 was added in the amount of 0.2%.

The foundry mixture was molded into a core and then an inert gas which contained a tertiary amine was passed through the core which rapidly cured the resin in the core so that it had sufficient green strength so that it could be removed from the mold. The presence of a tin catalyst reduced the time that the core was exposed to the amine gas by at least 40%. This cured core was then placed in the appropriate outer sand mold and molten cast iron was placed into the mold. The molten cast iron then surrounded the core and when sufficiently cooled, the cast iron part was removed from the sand mold. This core produced a good part and the sand was easily removed from the inside of the part.

The same example was again repeated with the exception that the lignin was replaced with kraft soda lignin.

The same example was gain repeated as set forth initially except that the 0.5 pounds of Papi 27 was replaced with 0.8 pounds of 70% solution of Mondur PF, a commercially available isocyanate terminated prepolymer in propylene glycol monomethyl ether acetate.

In these additional examples the cores produced were as satisfactory as those produced in the initial example.

The amount of sand and resin used to produce cores represent a large volume of material. However, these represent a fraction of the material that is used to produce the sand mold which surrounds the core. This outer mold is not cured by using an amine gas in an inert gas stream. It is cured by adding a catalyst or combinations of catalysts to the sand resin isocyanate mixture. Once this mixture is completely mixed, it starts curing immediately and usually within several minutes it has cured to the extent that it has sufficient green strength so that the sand mold can be removed from its cope and drag which are usually wooden molds designed to give the sand its desired form.

EXAMPLE 4

Into a standard laboratory foundry muller which has the capacity for mixing at least 100 pounds of foundry sand, 100 pounds of foundry sand was charged and allowed to mix while 1 pound of a 50% lignin solution in DBE (dimethyl glutarate, dimethyl adipate, dimethyl succinate--Dupont- mixed aliphatic dimethyl esters). This solution contains 5% of Dow resin 565. This was then added to the sand and allowed to mix for 1 minute. Then 0.01 pound of an amine catalyst, namely phenol propylpyridine was added to the mixture and mixed for only 20 seconds. This foundry mix was molded into a core and also outer sand mold and within a few minutes the core had developed a sufficient green strength so that it could be removed from the mold. This cured core and outer sand mold were put together and then molten cast iron was poured into the mold. The molten cast iron surrounded the core and when sufficiently cooled, the cast iron part was removed from the sand mold. The part that was removed was a good part which showed that the core and outer sand mold performed well thereby showing that lignin functions as a binder for both the core and outer sand mold.

The same example was again repeated with the exception that the lignin was replaced with kraft soda lignin.

The same example was again repeated as set forth initially except that the 0.5 pounds of Papi 27 was replaced with 0.8 pounds of 700% solution Mondur PF, a commercially available isocyanate terminated prepolymer glycol monomethyl ether acetate.

It will be apparent to those skilled in the art that it is possible to dissolve or suspend the lignin in the polyol rather than a solvent under appropriate conditions.

In these additional examples the cores produced were as satisfactory as those produced in the initial example.

Another disclosure of the invention is that it has been discovered that using a lignin type polyol has major commercial advantages for foundry and other materials. Because once the lignin molecule has been reacted with propylene oxide, ethylene oxide or other oxirane materials there is a dramatic change in the physical characteristics of the lignin molecule. One major advantage is a dramatic change in the solubility characteristics of the lignin molecule. The pure lignin molecule requires solvents which have a high percentage of oxygen and these solvents are generally more expensive tan the hydrocarbon solvents that are used in foundry resin systems. Therefore by reacting the lignin molecule with propylene oxide or other oxirane materials the less expensive hydrocarbon solvents can be used. Also another major change in the lignin molecule is its viscosity characteristics. Because by reacting the lignin molecules with propylene oxide or other oxirane containing materials the final viscosity of the foundry resin is much lower at the same solids level. The viscosity of the foundry resin is a very important parameter because there exists only a limited amount of time for the foundry resins, and isocyanate to mix with the sand before this combination mixture of resins and sand is put into a pattern to produce a sand core or sand mold. It has been determined that high viscosity foundry resins do not mix very well and do not produce a homogeneous mixture with the sand. As a consequence the sand cores or sand molds that are produced from this mixture do not develop adequate green strength or may in some areas that contain high concentrations of unreacted resins which produce major casting defects when the molten metal comes in contact with the sand core or sand mold. It is also a major advantage to produce a lignin based polyol that contains as much lignin as possible. This is because in the process of making a lignin polyol some formulations may contain large percentages of water which will react with propylene oxide will produce a large percentage of polyether polyols. The preferred reaction in this case is to have the propylene oxide or other oxirane materials react with as much lignin as possible. In the process of preparing the lignin polyol the preferred reaction would be to have the reaction take place between the lignin and propylene oxide with only a minimum of water present. By minimizing the water you are minimizing the side reactions of the propylene oxide or other oxirane containing materials. In this manner you are concentration on the reaction between the lignin molecule and propylene oxide or other oxirane containing materials.

There is disclosed the process of preparing a foundry resin that uses a lignin material that has been reacted with propylene oxide or ethylene oxide or other oxirane containing materials. It is preferred that such material contain less than 2i sodium potassium or other ions. The resulting lignin polyol should contain at least 21% lignin;

The process wherein a hydrocarbon solvent is used to reduce the viscosity of a foundry resin;

The process wherein an oxygenated solvent is used to reduce the viscosity of a foundry that is based on a lignin based polyol The process wherein a combination of hydrocarbon solvent and an oxygenated solvent are used to reduce the viscosity of foundry resin based on a lignin based polyol;

The process wherein the lignin base molecule is capped with ethylene oxide so that the lignin based polyol contains primary hydroxis which makes the lignin based polyol more reactive;

The process wherein the lignin based molecule or polyol reacted with a molecule to produce a polyol which has terminal primary hydroxyls.

The reaction of propylene oxide with the lignin molecule will produce a lignin based polyol that is terminated with secondary hydroxyls as a functional group. However it is known in urethane chemistry that secondary hydroxyls are not as reactive as primary hydroxyls with isocyanates. This fact has significant commercial advantages for a foundry. This means that primary hydroxyls by virtue of their faster reaction will cross link or cure faster than a resin will that contains secondary hydroxyls. This means that a sand core or sand mold will develop adequate green strength in a shorter period of time. This means high productivity for a foundry and less defective and scrap castings.

EXAMPLE 5

The amount of sand and resin used to produce cores represent a large volume of material. However, these represent a fraction of the material that is used to produce the sand mold which surrounds the core. This outer mold is not cured by using an amine gas in an inert gas stream. It is cured by adding a catalyst or combinations of catalysts to the sand resin isocyanate mixture. Once this mixture is completely mixed, it starts curing immediately and usually within several minutes it has cured to the extent that it has sufficient green strength so that the sand mold can be removed from its cope and drag which are usually wooden molds designed to give the sand its desired form.

Into a standard laboratory foundry muller which has the capacity for mixing at least 100 pounds of foundry sand, 100 pounds of foundry sand was charged and allowed to mix while 1 pound of a mixture that contains 0.8 pounds of a lignin polyol (that is a reaction product of lignin and propylene oxide) and 0.2 pounds of PM acetate (propylene glycol mono methyl ether acetate) was then added to the sand and allowed to mix for 1 minute. Then 0.8 pounds of Papi 27, the aromatic isocyanate, was added to this mixture and allowed to mix for one minute. Then 0.01 pound of an amine catalyst, namely phenol propylpyridine was added to the mixture and mixed for only 20 seconds. This foundry mix was molded into a core and also outer sand mold and within a few minutes the core so had developed a sufficient green strength so that it could be removed from the mold. This cured core and outer sand mold were put together then molten cast iron was poured into the mold. The molten cast iron surrounded the core and when sufficiently cooled, the cast iron part was removed from the sand mold. The part that removed was a good part which showed that the core and outer sand mold performed well thereby showing that lignin functions as a binder for both the core and outer sand mold.

EXAMPLE 6

The amount of sand and resin used to produce cores represent a large volume of material. However, these represent a fraction of the material that is used to produce the sand mold which surrounds the core. This outer mold is not cured by using an amine gas in an inert gas stream. It is cured by adding a catalyst or combinations of catalysts to the sand resin isocyanate mixture. Once this mixture is completely mixed, it starts curing immediately and usually within several minutes it has cured to the extent that it has sufficient green strength so that the sand mold can be removed from its cope and drag which are usually wooden molds designed to give the sand its desired form.

Into a standard laboratory foundry muller which has the capacity for mixing at least 100 pounds of foundry sand, 100 pounds of foundry sand was charged and allowed to mix while one pound of a mixture that contains 0.6 pounds of a lignin polyol (that is a reaction product of lignin and propylene oxide), 0.2 pounds of lignin and 0.2 pounds of propylene carbonate was then added to the sand and allowed to mix for 1 minute. Then 0.8 pounds of Papi 27, the aromatic isocyanate, was added to this mixture and allowed to mix for one minute. Then 0.01 pound of an amine catalyst, namely phenol propylpyridine was added to the mixture and mixed for only 20 seconds. This foundry mix was molded into a core and also outer sand mold and within a few minutes the core so had developed sufficient green strength so that it could be removed from the mold. This cured core and outer sand mold were put together and then molten cast iron was poured into the mold. The molten cast iron surrounded the core and when sufficiently cooled, the cast iron part was removed from the sand mold. The part that was removed was a good part which showed that the core and outer sand mold performed well thereby showing that lignin functions as a binder for both the core and outer sand mold. As general guidance, the disclosure of U.S. Pat. No. 4,851, 457 may be utilized in determining the relative amounts of lignin, isocyanates, solvents and catalysts to be used.

The invention has been described in detail with particular emphasis on the preferred embodiments thereof, but it should be understood that variations and modifications within the spirit and scope of the invention may occur to those skilled in the art to which the invention pertains.

What is claimed is:

1. The process of making a sand core or mold comprising the steps of: dissolving lignin in a suitable solvent, mixing said lignin-solvent solution and an isocyanate with sand, forming said mixture into a core or mold and allowing said mixture to cure, said lignin and isocyanate being present in amount in the range of ¼% to 10% by weight of sand, said lignin containing less than 2% sodium ion.

2. The process of claim 1 wherein a polyol that has a functionality greater than 3 is added to the mixture.

3. The process of claim 1 wherein a tin catalyst which is a tin compound with a valence of +4 is added to the mixture.

4. The process of claim 2 wherein a tin catalyst which is a tin compound with a valence of +4 is added to the mixture.

5. The process of claim 1 wherein the reaction product of an oxirane and bis phenol A is added to the mixture to increase the resistance of the core or mold to moisture.

6. The process of claim 2 wherein the reaction product of an oxirane and bis phenol A is added to the mixture to increase the resistance of the core or mold to moisture.

7. The process of claim 4 wherein the reaction product of an oxirane and bis phenol A is added to the mixture to increase the resistance of the core or mold to moisture.

8. A foundry core or mold composition curable to a hardened state comprising lignin which has been dissolved in a suitable solvent and mixed with an isocyanate and sand, said lignin and isocyanate being present in an amount in the range of ¼% to 10% by weight of the sand, said lignin containing less than 2% sodium ion.

9. The foundry core or mold as claimed in claim 8 which contains a tin catalyst which has a valence of +4.

10. The foundry core or mold as claimed in claim 8 which contains a polyol that has a functionality greater than 3.

11. The foundry core or mold as claimed in claim 8 which contains the reaction product of an oxirane and bis phenol A to increase the resistance of the core or mold to moisture.

12. The process of claim 3 wherein the reaction product of an oxirane and bis phenol A is added to the mixture to increase the resistance of the core or mold to moisture.

13. The process of claim 1 wherein a material selected from the group of materials consisting of terpene resins, terpene phenolic resins, coumarone-indene resins, rosin, rosin esters, modified phenol resins, natural and synthetic waxes, and petroleum resins is added to the mixture to increase the resistance of the core or mold to moisture.

14. The foundry core or mold as claimed in claim 8 wherein a material selected from the group of materials consisting of terpene resins, terpene phenolic resins, coumarone-indene resins, rosin, rosin esters, modified phenol resins, natural and synthetic waxes, and petroleum resins is added to the mixture to increase the resistance of the core or mold to moisture.

15. The process of claim 5 wherein said oxirane is selected from the group consisting of ethylene oxide and propylene oxide.

16. The process of claim 6 wherein said oxirane is selected from the group consisting of ethylene oxide and propylene oxide.

17. The process of claim 7 wherein said oxirane is selected from the group consisting of ethylene oxide and propylene oxide.

18. The process of claim 12 wherein said oxirane is selected from the group consisting of ethylene oxide and propylene oxide.

19. The foundry core or mold as claimed in claim 10 which contains a tin catalyst which has a valence of +4.

20. The foundry core or mold as claimed in claim 10 which contains the reaction product of an oxirane and bis phenol A.

21. The foundry core or mold as claimed in claim 19 which contains the reaction product of an oxirane and bis phenol A.

22. The foundry core or mold as claimed in claim 9 which contains the reaction product of an oxirane and bis phenol A.

23. The foundry core or mold as claimed in claim 11 wherein said oxirane is selected from the group consisting of ethylene oxide and propylene oxide.

24. The foundry core or mold as claimed in claim 20 wherein said oxirane is selected from the group consisting of ethylene oxide and propylene oxide.

25. The foundry core or mold as claimed in claim 21 wherein said oxirane is selected from the group consisting of ethylene oxide and propylene oxide.

26. The foundry core or mold as claimed in claim 22 wherein said oxirane is selected from the group consisting of ethylene oxide and propylene oxide.

27. The process of claim 1 comprising the step of using an amine catalyst to assist said cure.

28. The process of claim 3 comprising the step of subjecting the formed core or mold to an amine catalyst.

29. The process of claim 4 comprising the step of subjecting the formed core or mold to an amine catalyst.

30. The foundry core or mold composition as claimed in claim 8 which has been cured by an amine catalyst.

31. The foundry core or mold composition as claimed in claim 9 which has been cured by an amine catalyst.

32. The foundry core or mold composition as claimed in claim 19 which has been cured by an amine catalyst.

* * * * *

UNITED STATES PATENT AND TRADEMARK OFFICE
CERTIFICATE OF CORRECTION

PATENT NO : 5,786,409
DATED : July 28, 1998
INVENTOR(S): Kenneth R. Kurple

It is certified that error appears in the above-identified patent and that said Letters Patent is hereby corrected as shown below:

Col. 6 line 21, delete "700%", and insert -- 70% --.

Col. 7 line 13, delete "2i", and insert -- 2% --.

Signed and Sealed this

Twenty-ninth Day of December, 1998

Attest:

BRUCE LEHMAN

Attesting Officer

Commissioner of Patents and Trademarks